US008893572B2

(12) United States Patent
Wu et al.

(10) Patent No.: US 8,893,572 B2
(45) Date of Patent: Nov. 25, 2014

(54) BACKLASH ELIMINATING DEVICE FOR HELICAL GEARS

(75) Inventors: Jinn-Fa Wu, Taichung (TW);
Chiu-Hung Li, Taichung (TW);
Hsi-Hung Hsiao, Taichung (TW);
Chin-Mou Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 275 days.

(21) Appl. No.: 13/551,191

(22) Filed: Jul. 17, 2012

(65) Prior Publication Data

US 2013/0145875 A1    Jun. 13, 2013

(30) Foreign Application Priority Data

Dec. 8, 2011    (TW) .............................. 100145413 A

(51) Int. Cl.
*F16H 55/18*    (2006.01)
(52) U.S. Cl.
USPC .................................. 74/409; 74/434; 74/440
(58) Field of Classification Search
CPC ......... F16H 55/17; F16H 55/18; F16H 57/12; F16H 55/24; F16H 55/22; F16H 55/28; F16H 55/20
USPC ........... 74/409, 411, 413, 431, 434, 440, 457; 384/490; 475/346, 347
See application file for complete search history.

(56) References Cited

U.S. PATENT DOCUMENTS

| | | | |
|---|---|---|---|
| 2,655,050 A | 10/1953 | Divette et al. | |
| 4,036,074 A | 7/1977 | Bodnar | |
| 4,463,957 A * | 8/1984 | Nagai et al. | ................ 277/348 |
| 4,554,842 A | 11/1985 | Wood, III | |
| 4,660,432 A * | 4/1987 | Damas | ........................... 74/440 |
| 4,858,486 A | 8/1989 | Weyer | |

(Continued)

FOREIGN PATENT DOCUMENTS

| CN | 2755358 | 2/2006 |
|---|---|---|
| CN | 1769740 | 5/2006 |

(Continued)

OTHER PUBLICATIONS

Mohammadias1, "Vibration Detection and Backlash Suppression in Machine Tools", 2009 IEEE/RSJ International Conference on Intelligent Robots and Systems, Oct. 11-15, 2009, pp. 972-977.

(Continued)

*Primary Examiner* — Troy Chambers
*Assistant Examiner* — Alexander Vu
(74) *Attorney, Agent, or Firm* — Muncy, Geissler, Olds & Lowe, P.C.

(57) ABSTRACT

A backlash eliminating device for helical gears is provided for a gear transmission system which includes a transmission shaft, two helical gears and a match gear. A sleeve mounted on the transmission shaft has an outer wall, an inner wall and at least two sections of spiral grooves penetrating through the outer wall and the inner wall. The sleeve includes a transmission part and two extremity parts. The transmission part is disposed between the spiral grooves, and is fixedly connected to the transmission shaft. The extremity parts are disposed outside of the spiral grooves. The helical gears are fixedly connected to the two extremity parts. The sleeve having the spiral grooves provides a preload spring force along an axial direction of the transmission shaft, so that the two helical gears are tightly engaged with the match gear.

11 Claims, 9 Drawing Sheets

(56) References Cited

U.S. PATENT DOCUMENTS

| | | | |
|---|---|---|---|
| 6,871,858 B2 * | 3/2005 | Futai | 277/500 |
| 7,854,995 B1 * | 12/2010 | Anderson | 428/546 |
| 2005/0252328 A1 * | 11/2005 | Shattuck et al. | 74/431 |
| 2009/0314114 A1 | 12/2009 | Grosberg | |
| 2010/0240490 A1 | 9/2010 | Schafer | |
| 2011/0053730 A1 * | 3/2011 | Fox et al. | 475/347 |
| 2013/0145875 A1 * | 6/2013 | Wu et al. | 74/409 |
| 2013/0150205 A1 * | 6/2013 | Wu et al. | 475/347 |
| 2013/0199323 A1 * | 8/2013 | Fong et al. | 74/409 |

FOREIGN PATENT DOCUMENTS

| | | |
|---|---|---|
| CN | 201190780 | 2/2009 |
| CN | 201318432 | 9/2009 |
| CN | 101865273 | 10/2010 |
| CN | 101932851 A | 12/2010 |
| JP | 6307504 | 11/1994 |
| JP | 7127694 | 5/1995 |
| JP | 7229551 | 8/1995 |
| JP | 07229551 A * | 8/1995 ... F16H 55/18 |
| JP | 8303558 | 11/1996 |
| JP | 10246314 | 9/1998 |
| JP | 2000213631 | 8/2000 |
| JP | 2006077826 | 3/2006 |
| JP | 2010164188 | 7/2010 |
| JP | 2010216518 | 9/2010 |
| TW | 534249 | 5/2003 |
| TW | 200422541 | 11/2004 |
| TW | M354526 U | 4/2009 |
| TW | 201121737 A | 7/2011 |

OTHER PUBLICATIONS

"Seeking For a Backlashless Spur Gear", Machinery Monthly, vol. 22, No. 5, May 1996, pp. 350-355 (Abstract attached).

Lotfi, et al., "A novel algorithm to generate backlash-free motions", Mechanism and Machine Theory 45, 2010, pp. 1171-1184.

Brauer, "Transmission error in anti-backlash conical involute gear transmissions: a global-local FE approach", Finite Elements in Analysis and Design 41, 2005, pp. 431-457.

* cited by examiner

US 8,893,572 B2

BACKLASH ELIMINATING DEVICE FOR HELICAL GEARS

This application claims the benefit of Taiwan application Serial No. 100145413, filed Dec. 8, 2011, the disclosure of which is incorporated by reference herein in its entirety.

BACKGROUND

1. Technical Field

The disclosed embodiments relate in general to a transmission system, and more particularly to a backlash eliminating device of a transmission system for helical gears.

2. Description of the Related Art

As the industries are gaining rapid advance, the precision standards expected of the machines and tools are getting higher and higher. The transmission system plays an essential role for the various machines and tools. Through the use of the gear of the transmission system, the power of a transmission shaft is transmitted to the passive gear for achieving the function of transmission.

The problem with the gear transmission system is "backlash". The backlash is a tiny gap between the teeth for preventing the rejection or jam occurring due to manufacturing errors or thermal expansion during the engagement between gears. However, for the transmission system requiring higher and higher transmission precision, the backlash, not only causing unnecessary noises and vibrations but further forming positioning errors in transmission and deteriorating transmission efficiency, has been a long existing problem to the industries.

SUMMARY

The disclosure is directed to a backlash eliminating device for helical gears capable of providing a preload spring force along an axial direction for eliminating the backlash which occurs during the engagement between the gears, so that the torque between the gears without causing any backlash.

According to one embodiment, a backlash eliminating device for helical gears is provided for a transmission system including two helical gears and a match gear engaged with the two helical gears. The backlash eliminating device may include a sleeve and a plurality of gear fixing members. The sleeve is coaxial with the two helical gears. The two extremity parts of the sleeve are respectively connected to the two helical gears. At least two sections of spiral grooves are formed between the two extremity parts of the sleeve. Each section of spiral grooves penetrates the peripheral surface of the sleeve and surrounds the sleeve for at least two circles to form at least two sections of spiral sheet structures. In one embodiment, the axis fixing member connects the sleeve and the transmission shaft, and is positioned between the two sections of spiral sheet structures, so that the sleeve and the transmission shaft are rotated synchronically. The gear fixing members are respectively connected to the two extremity parts and the two helical gears, or are integrally formed in one piece with at least one of the sleeve and the two helical gears, so that a predetermined gap is formed between the two helical gears. Each section of spiral sheet structures provides a preload spring force along an axial direction of the transmission shaft, so that the two helical gears are tightly engaged with the match gear.

The above and other aspects of the disclosure will become better understood with regard to the following detailed description of the preferred but non-limiting embodiment(s). The following description is made with reference to the accompanying drawings.

Figure 1:
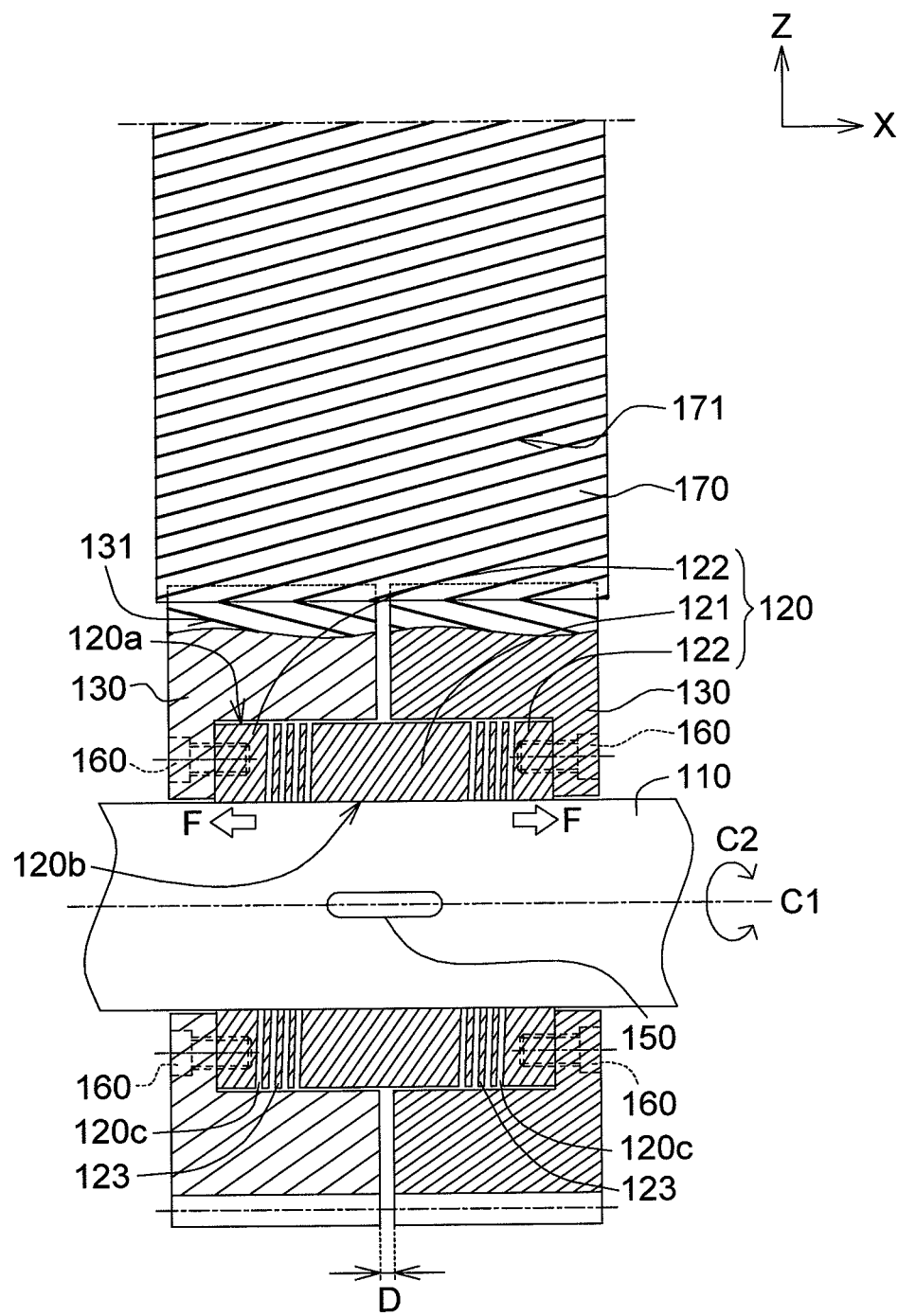
FIG. 1 is a schematic diagram showing a gear transmission system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 2A:
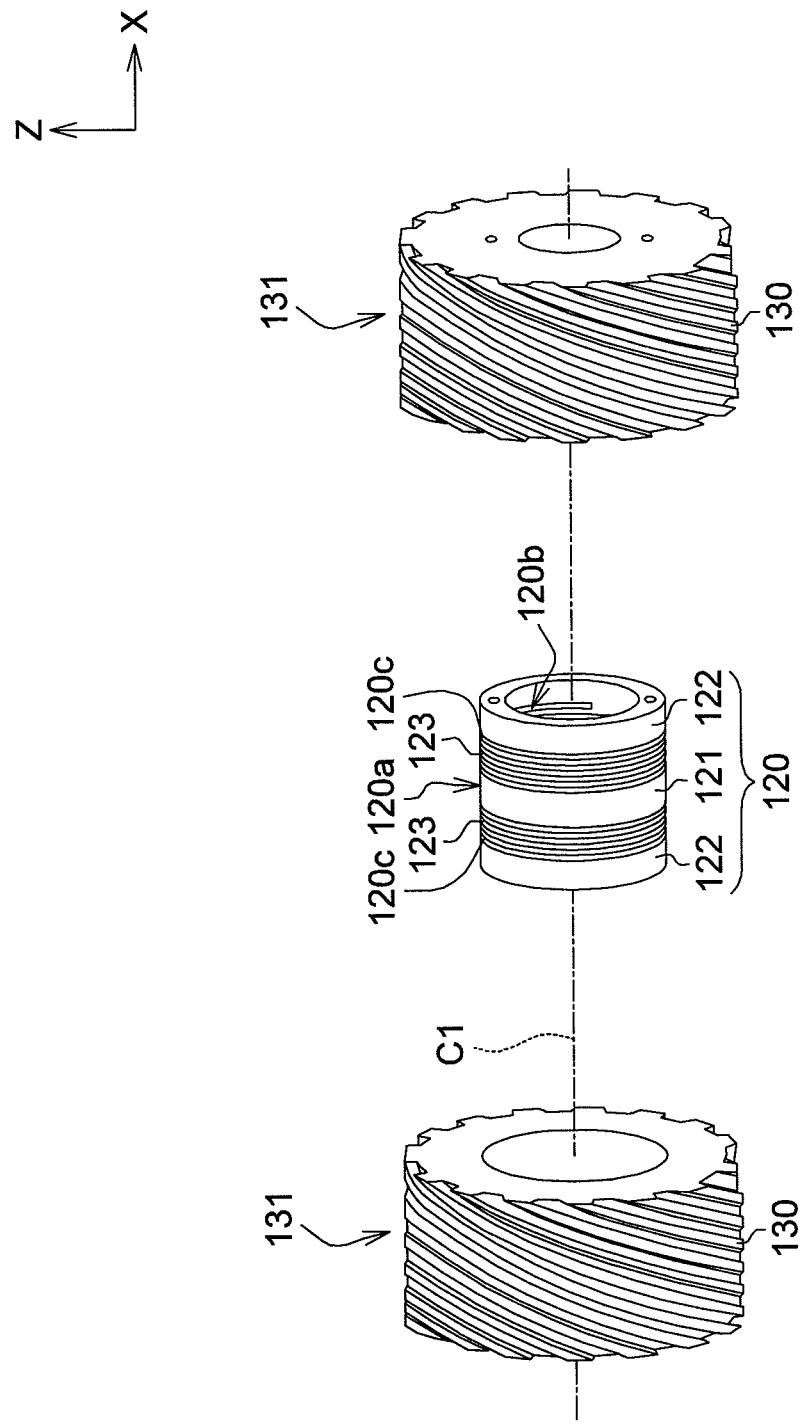
FIG. 2A is an explosion diagram showing partial elements of the gear transmission system of FIG. 1.
Figure 2B:
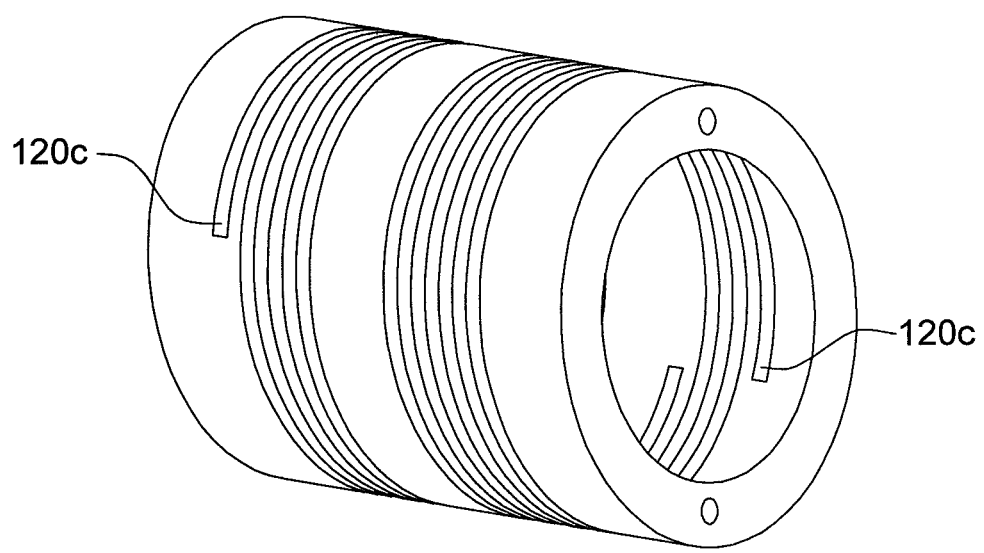
FIG. 2B is a 3D schematic diagram showing a sleeve of the gear transmission system of FIG. 1.

Referring to FIGS. 1, 2A and 2B. FIG. 1 is a schematic diagram showing a gear transmission system according to one embodiment of the disclosure. FIG. 2A is an explosion diagram showing partial elements (excluding the transmission shaft and the match gear) of the gear transmission system of FIG. 1. FIG. 2B is a 3D schematic diagram showing a sleeve of the gear transmission system of FIG. 1. As indicated in FIG. 1, the gear transmission system 100 includes a transmission shaft 110, two helical gears 130 and a match gear 170 engaged with the two helical gears 130. In one embodiment, the transmission shaft 110 may be connected to a power source (such as motor) for outputting a rotation torque. Through the two helical gears 130, the transmission shaft 110 transmits the rotation torque to the match gear 170 engaged with the two helical gears. Meanwhile, the match gear 170 is a passive gear. In another embodiment, the match gear 170 is an active gear, which may be connected to a power source (such as motor) for transmitting the rotation torque to the transmission shaft 110 through the two helical gears 130. Meanwhile, the transmission shaft 110 is a passive shaft. In the descriptions below, the transmission shaft 110 connected to a power source is exemplified.

As indicated in FIGS. 1 and 2A, the surface of each of the two helical gears 130 has a helical pattern 131, wherein the two helical gears 130 are respectively engaged with the helical pattern 171 of the match gear 170 through the helical pattern 131. The pitch of the helical pattern 171 is the same with that of the helical pattern 131. To resolve the backlash which occurs between the match gear 170 and the two helical gears 130, the sleeve 120 having a helical sheet structure 123 is used for eliminating the backlash in the present embodiment.

As indicated in FIGS. 2A and 2B, the sleeve 120, being a hollow cylindrical structure, is mounted on the transmission shaft 110. The sleeve 120 is coaxial with the two helical gears 130 and is disposed between two helical gears 130 for transmitting the rotation torque of the transmission shaft 110 to the two helical gears 130.

The sleeve 120 has an outer wall 120a, an inner wall 120b and at least two sections of spiral grooves 120c. Each section of spiral grooves 120c penetrates the outer wall 120a and the inner wall 120b, and surrounds the sleeve 120 for at least two circles. As indicated in FIG. 1, each section of spiral grooves 120c surrounds the sleeve 120 for four circles to form at least two sections of spiral sheet structures 123 respectively surrounding the sleeve 120 for three circles. The helical sheet structures 123 may have elasticity in the axial direction C1 of the transmission shaft 110 for providing a preload spring force F, so that the two helical gears 130 are tightly engaged with the match gear 170 for eliminating the backlash.

Figure 3A:
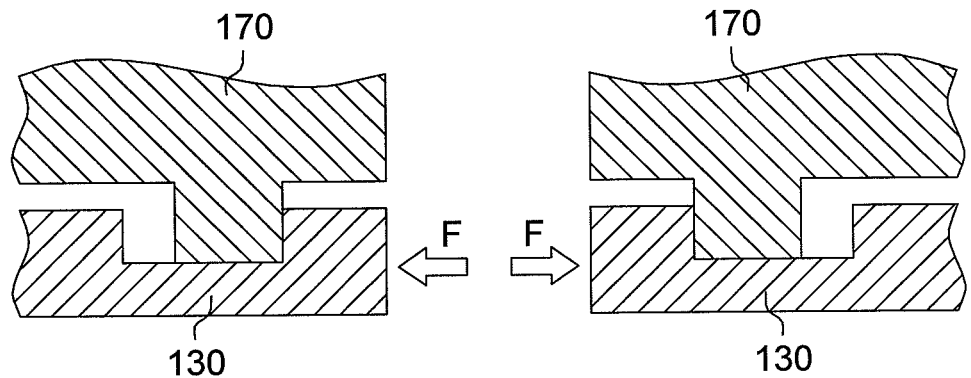
FIGS. 3A and 3B are schematic diagrams showing two helical gears being pushed towards or away from each other by a preload spring force.
Figure 3B:
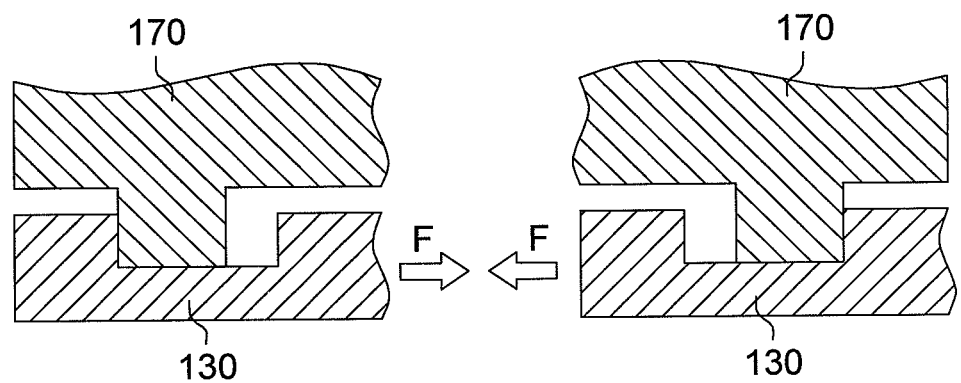

In one embodiment, the preload spring force F is a stretching force for pushing two helical gears 130 away from each other. In another embodiment, the preload spring force F is a compression force for pulling the two helical gears 130 towards each other. Both the stretching force and the compression force enable the two helical gears 130 to be tightly engaged with the match gear 170, so that the torque is transmitted between the gear groups without causing any backlash. Referring to FIG. 3A, when the preload spring force F pushes the two helical gears 130 towards the two sides, the left flank of the helical gear 130 located at the left hand side contacts the right flank of the match gear 170, and the right flank of the helical gear 130 located at the right hand side contacts the left flank of the match gear 170 so as to eliminate the backlash during transmission. Referring to FIG. 3B, when the preload spring force F pulls the two helical gears 130 towards the central part, the right flank of the helical gear 130 located at the left hand side contacts the left flank of the match gear 170 and the left flank of the helical gear 130 located at the right hand side contacts the right flank of the match gear 170 so as to eliminate the backlash during transmission. Thus, the apparatus of the present embodiment is able to eliminate the backlash which occurs during the forward/backward engagement between the two helical gears 130 and the match gear 170.

In terms of the transmission of the rotation torque, as indicated in FIG. 1, the sleeve 120 includes a transmission part 121 and two extremity parts 122. The transmission part 121 is disposed between the two spiral grooves 120c. The extremity parts 122 are disposed outside of the spiral grooves 120c and press against the two helical gears 130. The transmission part 121 is connected to the transmission shaft 110 through the axis fixing member 150 for transmitting the rotation torque of the transmission shaft 110 to the sleeve 120, so that the sleeve 120 and the transmission shaft 110 are rotated synchronically. Besides, the two helical gears 130 are respectively connected to the two extremity parts 122 of the sleeve 120 through the gear fixing members 160, so that the rotation torque of the sleeve 120 is transmitted to the two helical gears 130 and a predetermined gap D is formed between the two helical gears 130. In the present embodiment, the axis fixing member 150 is such as a taper key, a bolt or a tapered power lock, and the gear fixing members 160 are such as bolts.

Since the helical sheet structures 123 formed by the spiral grooves 120c are hard structures in the circumferential direction C2, the rotation torque of the transmission part 121 continues to be transmitted to the extremity parts 122 through the helical sheet structures 123. In addition, the two helical gears 130 are fixedly connected to the two extremity parts 122 of the sleeve 120, so the rotation torque of the two extremity parts 122 continues to be transmitted to the two helical gears 130.

Second Embodiment

Figure 4:
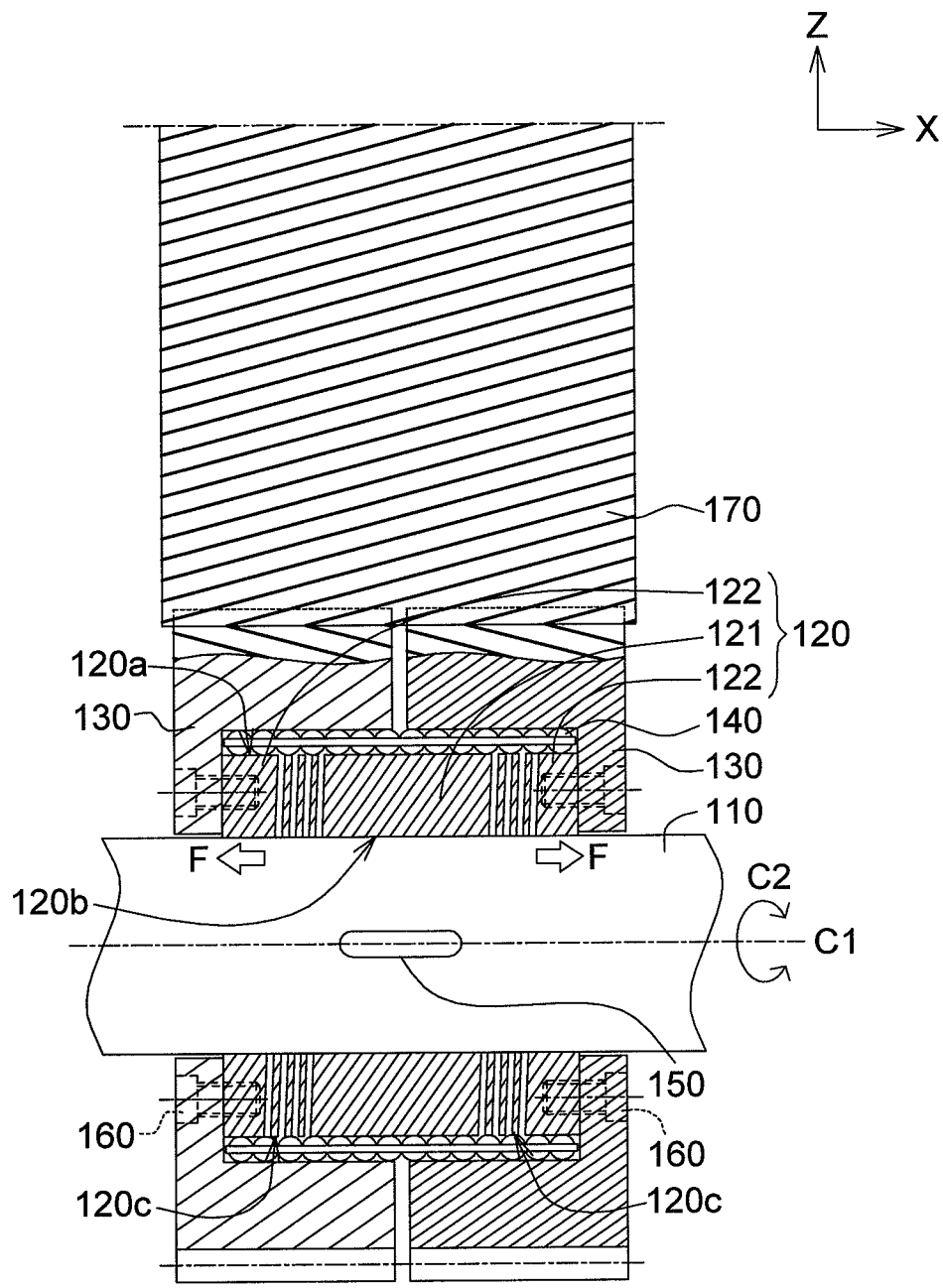
FIG. 4 is a schematic diagram showing a gear transmission system according to one embodiment of the disclosure.

Referring to FIG. 4, a schematic diagram showing a gear transmission system according to one embodiment of the disclosure is shown. The gear transmission system 101 of the present embodiment is different from the first embodiment in that the backlash eliminating device further includes a ball bushing 140, and the similarities are not repeated here.

The ball bushing 140 is disposed on the outer wall 120a of the sleeve 120 and contacts helical gears 130. The ball bushing 140 disposed between the sleeve 120 and the helical gears 130 may reduce the gap between the helical gears 130 and the sleeve 120 for increasing the hardness and stability in the radial direction of the helical gears 130.

Third Embodiment

Figure 5:
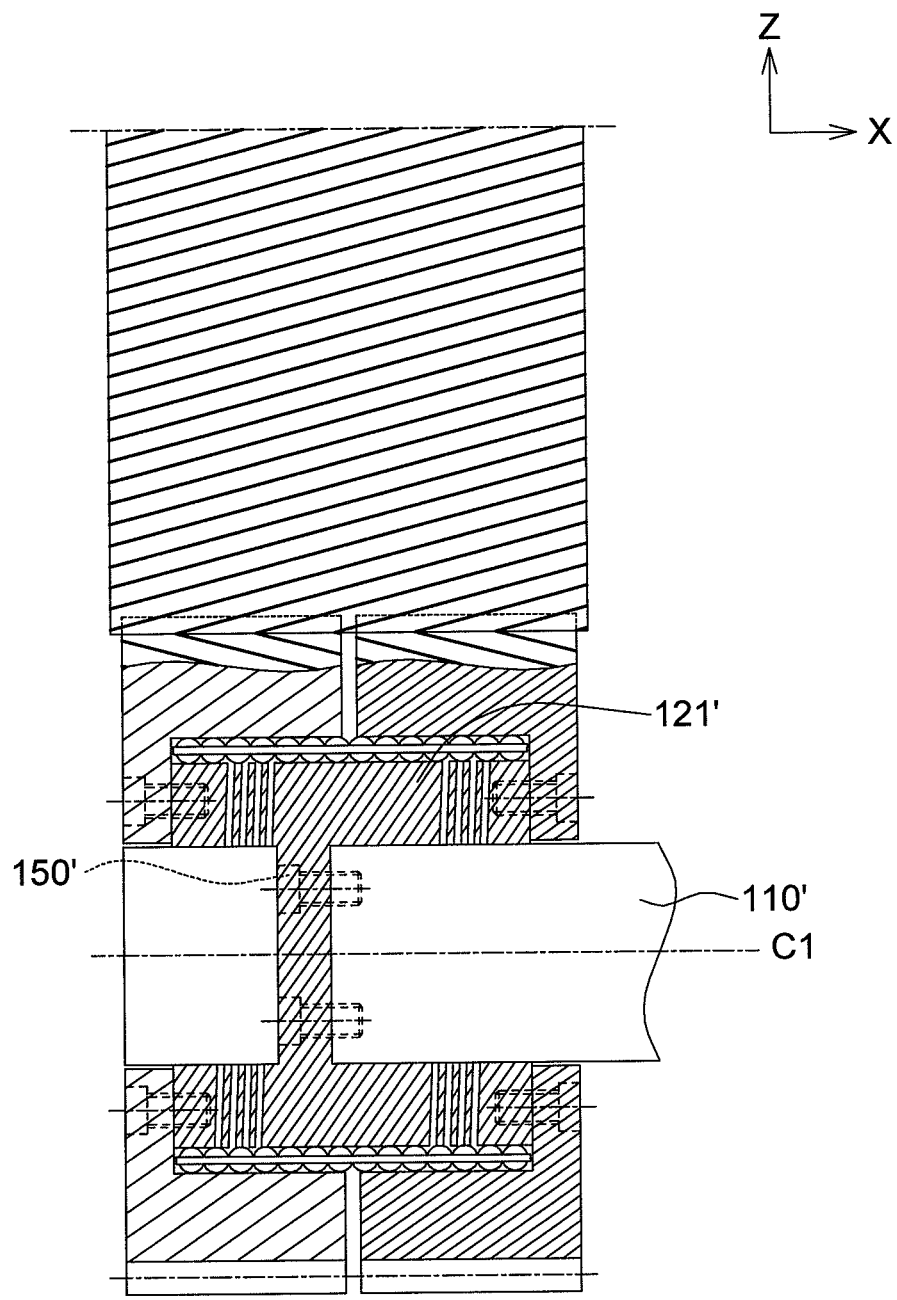
FIG. 5 is a schematic diagram showing a gear transmission system according to one embodiment of the disclosure.

Referring to FIG. 5, a schematic diagram showing a gear transmission system according to one embodiment of the disclosure is shown. The gear transmission system 102 of the present embodiment is different from the second embodiment in that the fixing manner between the transmission part 121' and the transmission shaft 110', and the similarities are not repeated here.

In the present embodiment, the axis fixing member 150' penetrates the transmission part 121' along the axial direction C1 of the transmission shaft 110'. The axis fixing member 150' is such as a bolt for fixedly connecting the transmission part 121' of the sleeve to the transmission shaft 110'.

Fourth Embodiment

Figure 6:
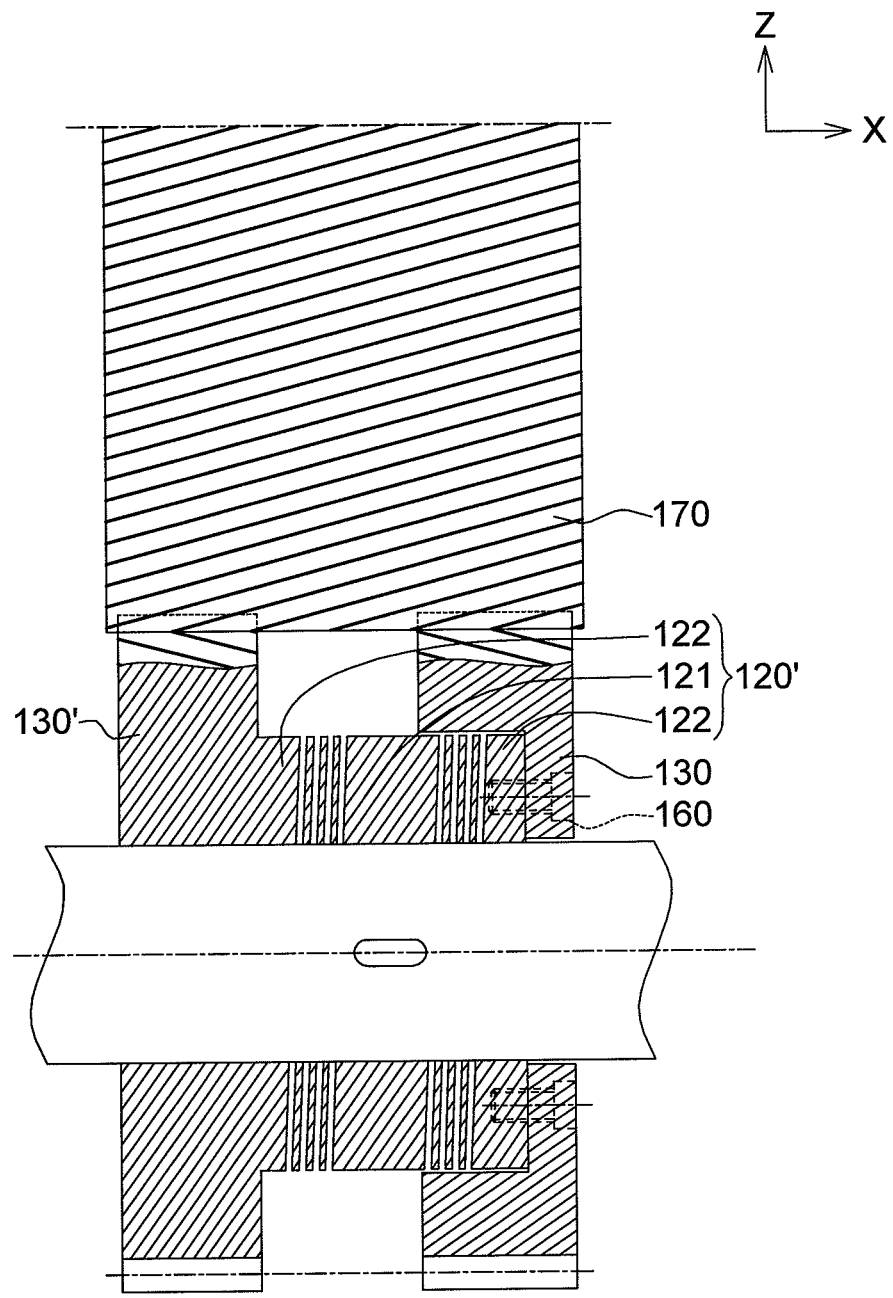
FIG. 6 is a schematic diagram showing a gear transmission system according to one embodiment of the disclosure.

Referring to FIG. 6, a schematic diagram showing a gear transmission system according to one embodiment of the disclosure is shown. The gear transmission system 103 of the present embodiment is different from the first embodiment in that the sleeve 120' and a helical gear 130' are integrally formed in one piece, and the similarities are not repeated here.

In the present embodiment, the sleeve 120' and the helical gear 130' are integrally formed in one piece, and there is no need to connect the sleeve 120' and the helical gear 130' by a gear fixing member.

Fifth Embodiment

Figure 7:
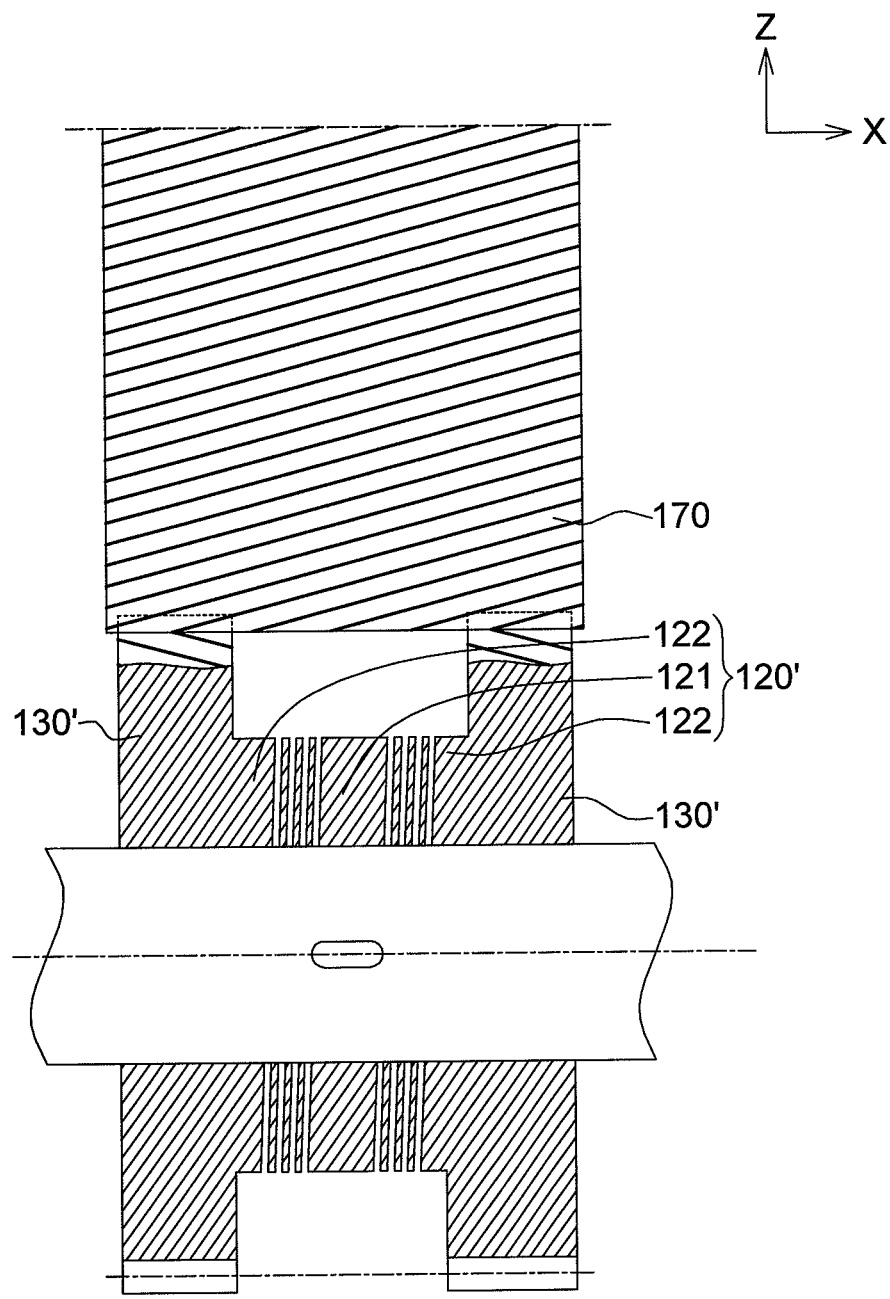
FIG. 7 is a schematic diagram showing a gear transmission system according to one embodiment of the disclosure.

Referring to FIG. 7, a schematic diagram showing a gear transmission system according to one embodiment of the disclosure is shown. The present gear transmission system 104 of the embodiment is different from the first embodiment in that the sleeve 120' and the two helical gears 130' are integrally formed in one piece, and the similarities are not repeated here.

In the present embodiment, the sleeve 120' and the two helical gears 130' are integrally formed in one piece, and there is no need to connect the sleeve 120' and the two helical gears 130' by gear fixing members.

Sixth Embodiment

Figure 8A:
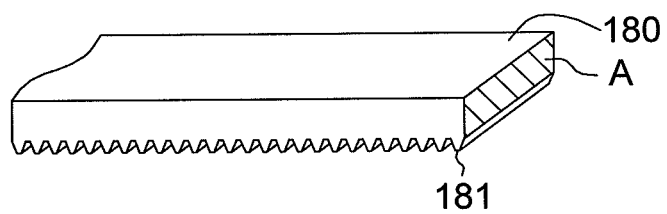
FIG. 8A is a schematic diagram showing a match gear being a rack.
Figure 8B:
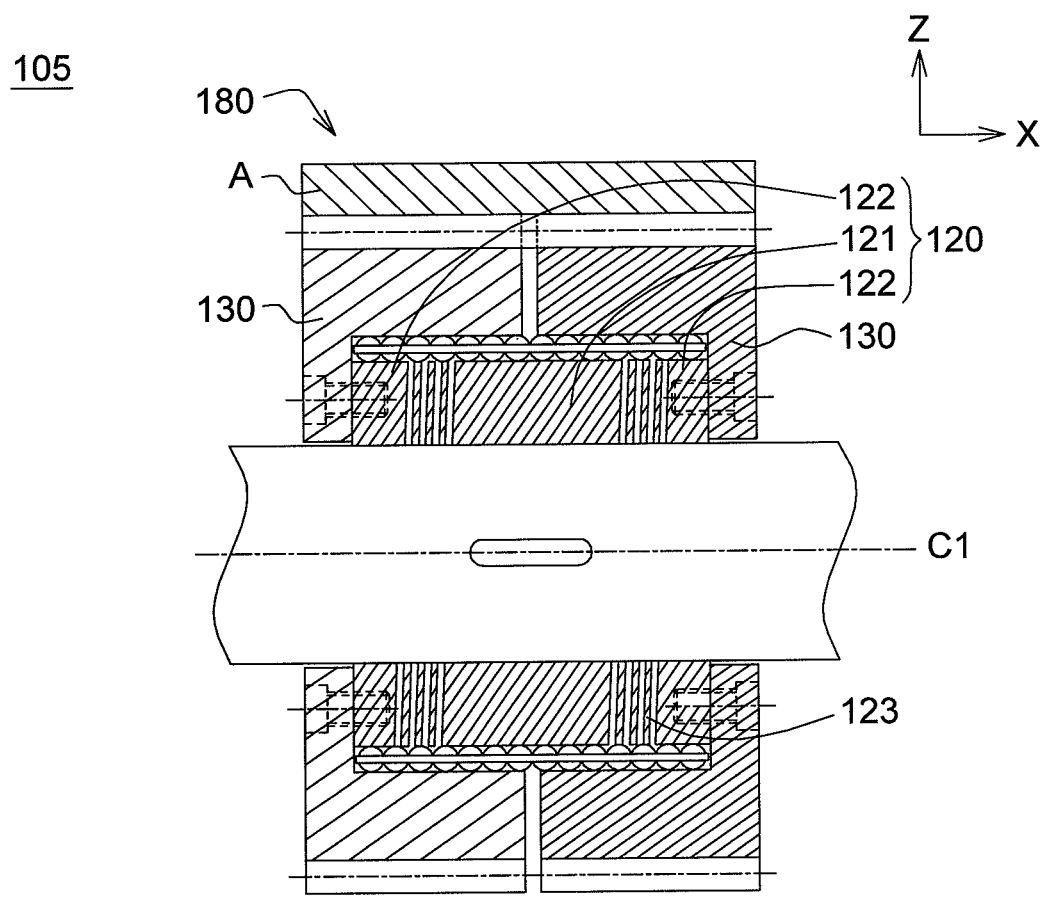
FIG. 8B is a schematic diagram showing a gear transmission system with two helical gears engaged by a rack.

Referring to FIGS. 8A and 8B. FIG. 8A is a schematic diagram showing a match gear being a rack, wherein region A is a cross-section of the rack 180, and the rack 180 has a helical tooth pattern 181 with equally spaced pitches. FIG. 8B is a schematic diagram showing a gear transmission system with two helical gears engaged by a rack. The gear transmission system 105 of the present embodiment provides a preload spring force through each section of spiral sheet structure 123 of the sleeve 120, so that two helical gears 130 are tightly engaged with the rack 180 to eliminate the backlash.

Descriptions regarding the backlash elimination and the disposition of the sleeve 120, two helical gears 130 and the transmission shaft may be obtained by reference to the above embodiments and are not repeated here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A backlash eliminating device for helical gears, wherein the backlash eliminating device for helical gears is used in a gear transmission system comprising two helical gears and a match gear engaged with the two helical gears, the backlash eliminating device comprising:

a sleeve being coaxial with the two helical gears and having two extremity parts, wherein the two extremity parts are respectively connected to the two helical gears, so that a predetermined gap is formed between the two helical gears, and at least two sections of spiral grooves are formed between the two extremity parts of the sleeve, each section of spiral grooves penetrates a peripheral surface of the sleeve and surrounds the sleeve for at least two circles to form at least two sections of spiral sheet structures, wherein, each section of spiral sheet structures provides a preload spring force along an axial direction, so that the two helical gears are engaged with the match gear without leaving any backlash.

2. The backlash eliminating device for helical gears according to claim 1, wherein the gear transmission system further comprises a transmission shaft and an axis fixing member, the sleeve and the two helical gears are mounted on the transmission shaft, and the axis fixing member connects the sleeve and the transmission shaft, so that the sleeve and the transmission shaft are rotated synchronically.

3. The backlash eliminating device for helical gears according to claim 2, wherein the sleeve comprises a transmission part which is disposed between the two sections of spiral sheet structures, and connects the axis fixing member.

4. The backlash eliminating device for helical gears according to claim 2, wherein the axis fixing member is a taper key, a bolt or a tapered power lock.

5. The backlash eliminating device for helical gears according to claim 1, further comprises a ball bushing which is disposed on an outer wall of the sleeve and contacts the two helical gears.

6. The backlash eliminating device for helical gears according to claim 1, wherein the sleeve is a hollow cylindrical structure.

7. The backlash eliminating device for helical gears according to claim 1, wherein the preload spring force pushes the two helical gears away from each other.

8. The backlash eliminating device for helical gears according to claim 1, wherein the preload spring force pulls the two helical gears towards each other.

9. The backlash eliminating device for helical gears according to claim 1, wherein the match gear is a rack engaged with the two helical gears.

10. The backlash eliminating device for helical gears according to claim 1, wherein the sleeve and at least one of the two helical gears are integrally formed in one piece.

11. The backlash eliminating device for helical gears according to claim 1, further comprising a plurality of gear fixing members fixedly connected to the two extremity parts and the two helical gears.

* * * * *